(12) United States Patent
Yoon

(10) Patent No.: US 7,196,752 B2
(45) Date of Patent: Mar. 27, 2007

(54) CHOLESTERIC LIQUID CRYSTAL COLOR FILTER WITH PROTRUSIONS AND ASSOCIATED METHODS OF MANUFACTURE

(75) Inventor: Sunghoe Yoon, Gyeonggi-do (KR)

(73) Assignee: L.G.Philips LCD Co., Ltd., Seoul (KR)

( * ) Notice: Subject to any disclaimer, the term of this patent is extended or adjusted under 35 U.S.C. 154(b) by 47 days.

(21) Appl. No.: 10/026,473

(22) Filed: Dec. 27, 2001

(65) Prior Publication Data

US 2002/0167278 A1  Nov. 14, 2002

(30) Foreign Application Priority Data

May 11, 2001  (KR) ............................... 2001-25693

(51) Int. Cl.
  *G02F 1/1335* (2006.01)
  *G02F 1/13* (2006.01)
(52) U.S. Cl. .................. 349/106; 349/115; 349/187
(58) Field of Classification Search ............ 315/169.3; 349/175, 106, 115, 155, 187
  See application file for complete search history.

(56) References Cited

U.S. PATENT DOCUMENTS

| 5,305,129 | A | * | 4/1994 | Fujiwara et al. ............ 349/29 |
| 5,650,867 | A | * | 7/1997 | Kojima et al. ............ 349/104 |
| 5,682,212 | A | * | 10/1997 | Maurer et al. ............. 349/5 |
| 5,847,791 | A | * | 12/1998 | Hao ........................ 349/106 |
| 5,963,284 | A | * | 10/1999 | Jones et al. .............. 349/112 |
| 6,097,464 | A | * | 8/2000 | Liu ......................... 349/130 |
| 6,099,134 | A | * | 8/2000 | Taniguchi et al. .......... 362/31 |
| 6,177,216 | B1 | * | 1/2001 | Broer et al. ............... 430/7 |
| 6,331,884 | B1 | * | 12/2001 | Masazumi et al. .......... 349/156 |
| 6,424,397 | B1 | * | 7/2002 | Kuo ........................ 349/139 |
| 6,452,653 | B1 | * | 9/2002 | Yamanaka et al. .......... 349/113 |
| 2002/0047965 | A1 | * | 4/2002 | Suzuki et al. .............. 349/113 |
| 2002/0167628 | A1 | * | 11/2002 | Yoon ...................... 349/106 |

FOREIGN PATENT DOCUMENTS

JP  07239471  * 9/1995
JP  11-305216  * 11/1999

* cited by examiner

*Primary Examiner*—Dung T. Nguyen
(74) *Attorney, Agent, or Firm*—McKenna Long & Aldridge LLP

(57) ABSTRACT

A reflective cholesteric liquid crystal (CLC) display device has a cholesteric liquid crystal color filter in which a plurality of protrusions is formed on an upper portion of the cholesteric liquid crystal color filter to obtain a uniform luminance and a uniform color in a main viewing angle range. The reflective cholesteric liquid crystal display device includes a first substrate, an absorption layer on the first substrate, a cholesteric liquid crystal color filter on the absorption layer, the cholesteric liquid crystal color filter having a plurality of protrusions, an overcoat layer on the cholesteric liquid crystal color filter, a first electrode on the overcoat layer, a second substrate, a second electrode beneath the second substrate, a retardation layer on the second substrate, a polarizer on the retardation layer, and a liquid crystal layer between the first electrode and the second electrode.

12 Claims, 4 Drawing Sheets

CHOLESTERIC LIQUID CRYSTAL COLOR FILTER WITH PROTRUSIONS AND ASSOCIATED METHODS OF MANUFACTURE

This application claims the benefit of Korean Patent Application No. 2001-25693, filed on May 11, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a reflective cholesteric liquid crystal (CLC) display device and a manufacturing method for the same.

2. Discussion of the Related Art

Flat panel display devices, which have properties of thin, low weight and low power consumption, have been required as the information age rapidly evolves. The flat panel display device may be classified into two types depending on whether it emits light or not. One is a light-emitting type display device that emits light to display images and the other is a light-receiving display device that uses an external light source to display images. Plasma display panels (PDPs), filed emission display (FED) devices and electro luminescence (EL) display devices are examples of the light-emitting type display devices and liquid crystal displays are an example of the light-receiving type display device. The liquid crystal display device is widely used for notebook computers and desktop monitors, etc. because of its superior resolution, color image display and quality of displayed images.

Generally, the liquid crystal display device has upper and lower substrates, which are spaced apart and facing each other. Each of the substrate includes an electrode and the electrodes of each substrate are facing each other. Liquid crystal is interposed between the upper substrate and the lower substrate. Voltage is applied to the liquid crystal through the electrodes of each substrate, and thus an alignment of the liquid crystal molecules is changed according the applied voltage to display images. Because the liquid crystal display device cannot emit light as described before, it needs an additional light source to display images. Accordingly, the liquid crystal display device has a back light behind a liquid crystal panel for a light source. An amount of light incident from the back light is controlled according the alignment of the liquid crystal molecules to display images. The electrodes of each substrate are formed of transparent conductive material and the substrates must be transparent. The liquid crystal display devices like this are called transmissive liquid crystal display devices. Because the transmissive liquid crystal display device uses an artificial light source such as the back light, it can display a bright image in dark surroundings. However, the transmissive liquid crystal display device has high power consumption.

The reflective liquid crystal display device has been suggested to overcome the power consumption problem of the transmissive liquid crystal display device. Because the reflective liquid crystal display device controls a transmittance according the alignment of liquid crystal molecules by irradiating light using an external light source such as ambient light or artificial light, it has a low power consumption compared with the transmissive liquid crystal display device. An electrode of the lower substrate is formed of conductive material, which has a high reflectance and an electrode of the upper substrate is formed of transparent conductive material to transmit the incident light.

The conventional reflective liquid crystal display device will be described hereinafter more in detail with reference to FIG. 1. FIG. 1 is a cross-sectional view of a conventional reflective liquid crystal display device. In FIG. 1, a plurality of switching elements (not shown) are formed in an array matrix on a first substrate 1 and a plurality of reflective electrode 3, which are connected to each of the switching elements, is formed on the first substrate 1. The reflective electrode 3, which is formed of conductive material such as metal, serves to reflect the incident light and serves as a pixel electrode. A color filter 4 that includes sub-color-filters red (R), green (G), and blue (B) in a repeated order is formed beneath a second substrate 2 and corresponds to the reflective electrode 3. A common electrode 5 is formed of transparent conductive material beneath the color filter 4. Liquid crystal is interposed between the reflective electrode 3 and the common electrode 5. An alignment of liquid crystal molecules is changed if a voltage is applied to the reflective electrode 3 and the common electrode 5. An alignment film (not shown) is respectively formed on the reflective electrode 3 and beneath the common electrode 5 to align the liquid crystal molecules into a uniform direction.

A retardation layer 7 is formed on the second substrate 2. The retardation layer 7 here in the figure has a phase difference of $\lambda/4$ and thus is called a quarter wave plate. The quarter wave plate 7 changes a linear polarization of light into a circular polarization of light and the circular polarization into the linear polarization. A polarizer 8, which changes ambient light into linearly polarized light by transmitting only the light that is parallel to a light transmission axis, is formed on the quarter wave plate 7. If the ambient light is irradiated to the reflective liquid crystal display device when the voltage is not applied, the incident light is changed into linearly polarized light as it passes through the polarizer 8, and the linearly polarized light is changed into circularly polarized light as it passes through the quarter wave plate 7. The circularly polarized light then passes through the second substrate 2, the color filter 4 and the common electrode 5 in sequence and there is no phase change during this process. The circularly polarized light then passes through the liquid crystal layer 6 and is changed into linearly polarized light as it passes through the liquid crystal layer 6 if the liquid crystal layer 6 is formed to have a phase difference of $\lambda/4$. The linearly polarized light is reflected at the reflective electrode 3 and then is changed into circularly polarized light as it passes again through the liquid crystal layer 6. The circularly polarized light is changed into the linearly polarized light as it passes again through the quarter wave plate 7, and then the linearly polarized light passes through the polarizer 8. At this time, if a polarized direction of the linearly polarized light is parallel to the light transmission axis of the polarizer 8, all of the linearly polarized light transmits through the polarizer 8 and if the polarized direction of the linearly polarized light is perpendicular to the light transmission axis of the polarizer 8, the linearly polarized light cannot transmit through the polarizer 8.

On the other hand, cholesteric liquid crystal (CLC) display devices, which use CLC color filter to display color images, has been widely researched and developed in the field. The reflective cholesteric liquid crystal display device, which has CLC color filter, has a superior color display ability and contrast ratio compared with a typical reflective liquid crystal display device that has an absorption type color filter. The cholesteric liquid crystal color filter uses a selective reflection property of the cholesteric liquid crystal. The cholesteric liquid crystal functions as a reflective mirror when each layer of helical structure has a perfect alignment. That is, when all helical axes of the cholesteric liquid crystal are aligned perpendicular to the substrate, the cholesteric liquid crystal functions as the reflective mirror in which the incident light is reflected at a surface of the mirror and an incidence angle and a reflection angle are same. The cholesteric liquid crystal does not reflect all incident light, but selectively reflects the incident light of a particular wavelength according to a helical pitch of the cholesteric liquid crystal. Accordingly, the reflected light may display red, green or blue color by controlling the helical pitch according to each region of the CLC color filter. The cholesteric liquid crystal color filter also determines a polarization state of the reflected light. The rotational direction of the cholesteric liquid crystal helix is an important factor to make a polarization phenomenon. For example, the left-handed cholesteric liquid crystal reflects a left circular polarization that has a wavelength corresponding to the pitch of the left-handed cholesteric liquid crystal. That is, a direction of a circular polarization of the reflected light depends on whether the helix structure of the cholesteric liquid crystal is right-handed or left-handed. This is a great difference from a typical dichroic mirror that simply reflects light of particular wavelength and transmits the rest of the light.

FIG. 2 is a cross-sectional view of a reflective cholesteric liquid crystal display device that has a CLC color filter according to the related art. Because the cholesteric liquid crystal color filter serves as a reflector as well as a color filter, an additional reflector is not needed. In FIG. 2, an absorption layer 12 is formed on the lower substrate 11 and a first alignment layer 13 is formed on the absorption layer 12. A cholesteric liquid crystal color filter 14 is formed on the first alignment layer 13. The cholesteric liquid crystal color filter 14 displays red, green or blue color by reflecting light that has a wavelength corresponding to the red, green or blue color, respectively. A transparent first electrode 15 is formed on the cholesteric liquid crystal color filter 14, and a second alignment layer 16 is formed on the first electrode 15. A transparent second electrode 22 is formed beneath an upper substrate 21, and a third alignment layer 23 is subsequently formed beneath the second electrode 22. A retardation layer 30 that has a phase difference of λ/4 is formed on the upper substrate 21, and a polarizer 40 is formed on the retardation layer 30. A liquid crystal layer 50 is positioned between the second alignment layer 16 and the third alignment layer 23. The alignment of liquid crystal molecules is changed according to an applied voltage between the first electrode 15 and the second electrode 22.

A driving mechanism of the reflective cholesteric liquid crystal display device, which uses a cholesteric liquid crystal color filter, is as follows. A phase difference in the liquid crystal occurs when the voltage is applied to the liquid crystal.

In case of normally black mode, when the voltage is not applied to the liquid crystal, incident light is linearly polarized as it passes through the polarizer 40 and subsequently circularly polarized as it passes through the retardation layer 30. The circularly polarized light passes through the liquid crystal layer 50 without a phase retardation and then transmits through the cholesteric liquid crystal color filter without reflection, and finally is absorbed in the absorption layer 12. Accordingly, there is no reflected light. Whereas, when the voltage is applied to the liquid crystal, incident light is linearly polarized as it passes through the polarizer 40 and subsequently circularly polarized as it passes through the retardation layer 30. The polarization property of the circularly polarized light is changed because of phase retardation as it passes through the liquid crystal layer 50. Only light of particular wavelength in the light that passes through the liquid crystal layer 50 is reflected at the cholesteric liquid crystal color filter 14, and the rest of the light transmits through the cholesteric liquid crystal color filter 14 and then is absorbed to the absorption layer 12. The polarization property of the reflected light is changed as it passes again through the liquid crystal layer 50, and the reflected light is linearly polarized as it passes through the retardation layer 30. The linearly polarized light finally passes through the polarizer 40.

In case of normally white mode, when the voltage is not applied to the liquid crystal, incident light is circularly polarized as it passes through the polarizer 40 and the retardation layer 30. The circularly polarized light passes through the liquid crystal layer 50 without phase retardation. Only light of a particular wavelength of the light that passes through the liquid crystal layer 50 is reflected at the cholesteric liquid crystal color filter 14, and the rest of the light transmits through the cholesteric liquid crystal color filter 14 and then is absorbed in the absorption layer 12. The reflected light passes again through the liquid crystal layer 50 without phase retardation and is linearly polarized as it passes through the retardation layer 30. The linearly polarized light finally passes through the polarizer 40. Whereas, when the voltage is applied to the liquid crystal, incident light is circularly polarized as it passes through the polarizer 40 and the retardation layer 30, and the polarization property of the circularly polarized light is changed because of the phase retardation as it passes through the liquid crystal layer 50. All of the light, that has passed through the liquid crystal layer 50 passes through the cholesteric liquid crystal (CLC) color filter 14 without reflection and then is absorbed to the absorption layer 12. Accordingly, there is no reflected light.

Because the reflective liquid crystal display device uses an external light source, an incidence angle of the light varies according to a position of the external light source. As described before, because the cholesteric liquid crystal color filter does a specular reflection, the reflection angle of the light depends on the incidence angle of the light. Accordingly, whereas a luminance in a certain viewing angle is very high, the luminance in the rest of viewing angle is lowered. In addition, because a size of the pitch of the cholesteric liquid crystal (CLC) helix, which the incident light experiences, is varied according to the incidence angle of the incident light, the wavelength of the reflected light is changed. Accordingly, a color of the reflected light varies depending on the incidence angle of the incident light and a change of color of the reflected light becomes greater as the incidence angle becomes bigger. These problems can be overcome by scattering the reflected light using a diffusion film over the liquid crystal panel, which helps to uniform the luminance in a main viewing angle range. Though an introduction of the diffusion film may overcome the luminance problem, there still exists a color change problem according to the incidence angle.

SUMMARY OF THE INVENTION

Accordingly, the present invention is directed to a reflective cholesteric liquid crystal (CLC) display device and a manufacturing method of a lower substrate for the reflective cholesteric liquid crystal (CLC) display device that substantially obviates one or more of problems due to limitations and disadvantages of the related art.

An advantage of the present invention is to provide a reflective cholesteric liquid crystal (CLC) display device that has a cholesteric liquid crystal (CLC) color filter in which a plurality of protrusions is formed on an upper portion of the cholesteric liquid crystal (CLC) color filter to obtain an uniform luminance and a uniform color within a main viewing angle range.

Another advantage of the present invention is to provide a manufacturing method of a lower substrate for a reflective cholesteric liquid crystal (CLC) display device that has a cholesteric liquid crystal (CLC) color filter.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective cholesteric liquid crystal (CLC) display device includes a first substrate, an absorption layer on the first substrate, a cholesteric liquid crystal (CLC) color filter over the absorption layer, the cholesteric liquid crystal (CLC) color filter having a plurality of protrusions, an overcoat layer on the cholesteric liquid crystal (CLC) color filter, a first electrode on the overcoat layer, a second substrate, a second electrode beneath the second substrate, a retardation layer on the second substrate, a polarizer on the retardation layer, and a liquid crystal layer between the first electrode and the second electrode. A shape, a size and a distribution of the protrusions are controlled to make a distribution of the reflected lights be uniform within a viewing angle range of 30 degrees upward and downward from a front direction or be decreased gradually within 20% of the luminance of a front direction. The reflective cholesteric liquid crystal (CLC) display device further includes a thin film transistor (TFT), which switches a signal to the second electrode, on the second substrate. The reflective cholesteric liquid crystal (CLC) display device further includes a thin film transistor, which switches a signal to the first electrode, on the first substrate.

A manufacturing method of a lower substrate for a reflective cholesteric liquid crystal (CLC) display device comprises the steps of forming an absorption layer on an insulating substrate, forming a cholesteric liquid crystal (CLC) color filter over the absorption layer, the cholesteric liquid crystal (CLC) color filter having a plurality of protrusions, forming an overcoat layer on the cholesteric liquid crystal (CLC) color filter, and forming a transparent electrode on the overcoat layer. The plurality of protrusions of the cholesteric liquid crystal (CLC) color filter is formed through exposing and developing a photoresist film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
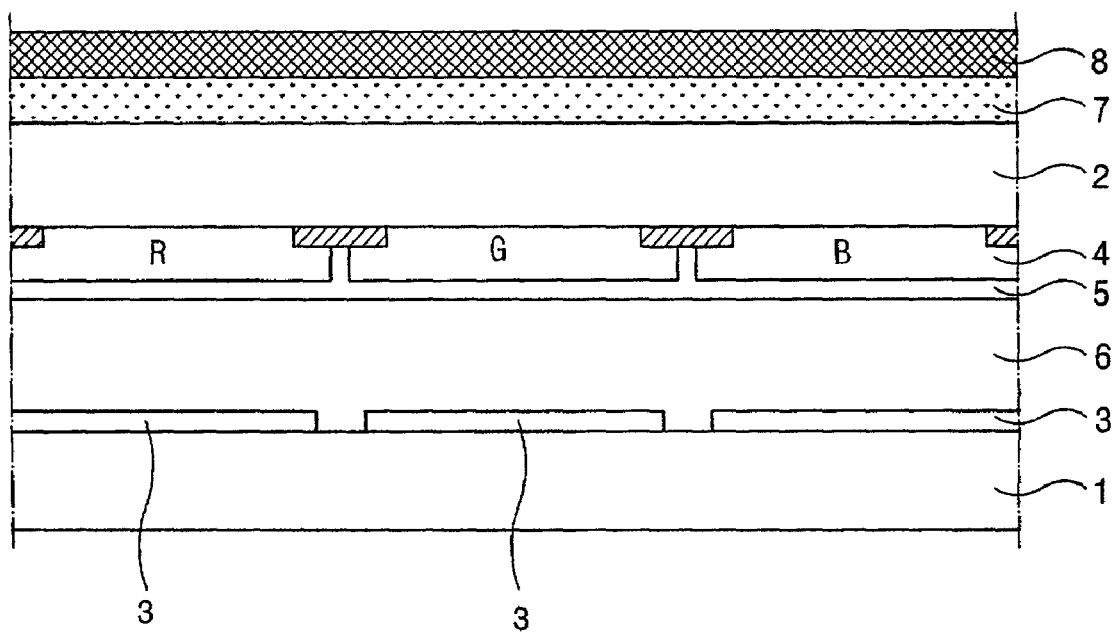
FIG. 1 is a cross-sectional view of a conventional reflective liquid crystal display device.
Figure 2:
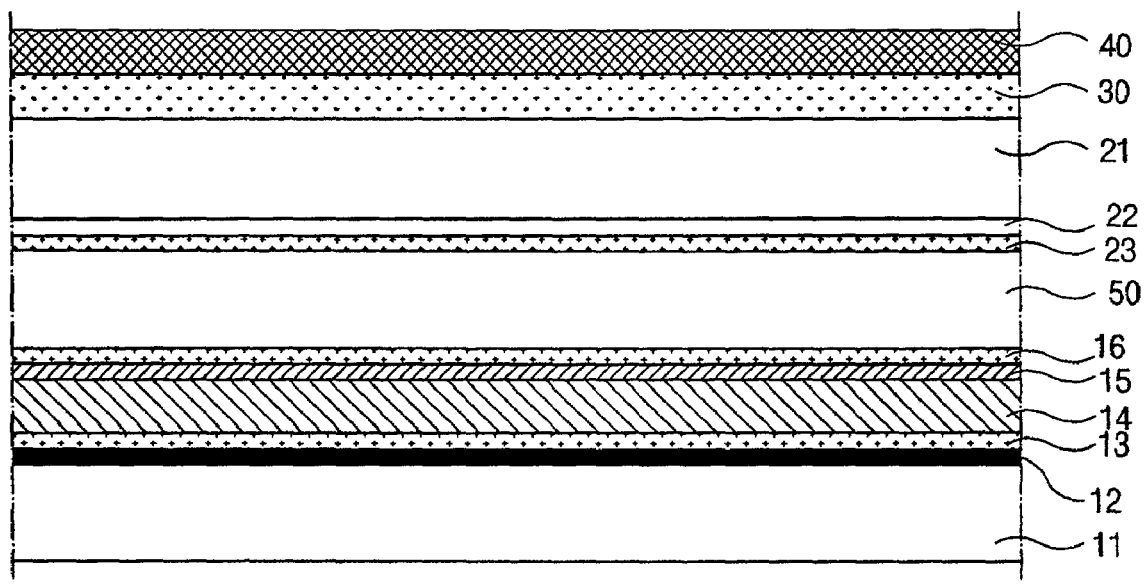
FIG. 2 is a cross-sectional view of a reflective cholesteric liquid crystal (CLC) display device having a CLC color filter according to the related art.
Figure 3:
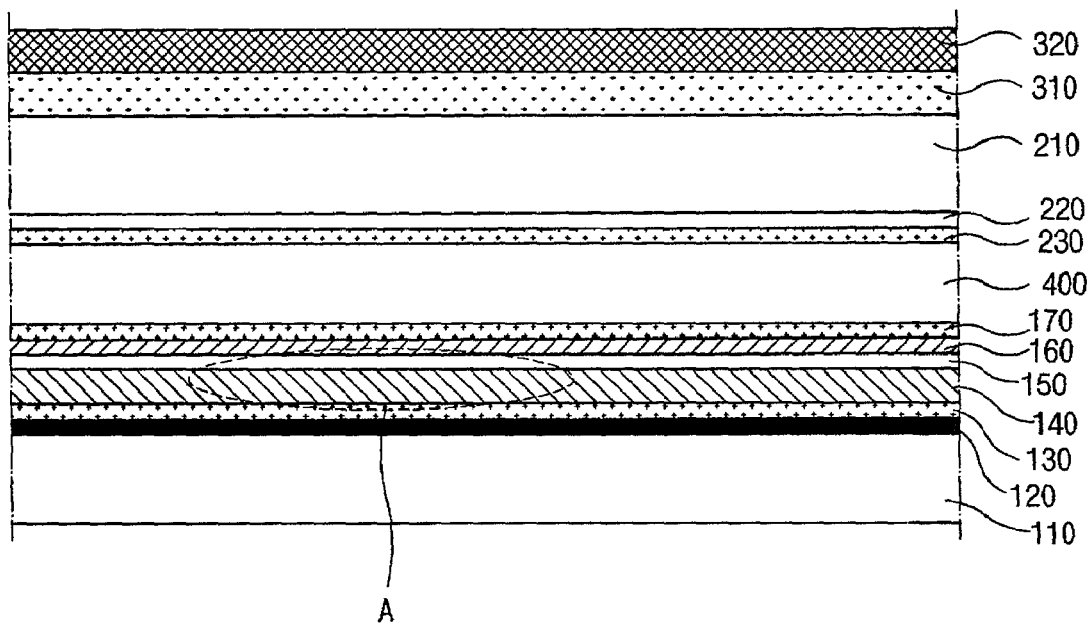
FIG. 3 is a cross-sectional view of a reflective cholesteric liquid crystal (CLC) display device having a CLC color filter according to the present invention.

FIG. 3 is a cross-sectional view of a reflective cholesteric liquid crystal (CLC) display device that has a CLC color filter according to the present invention. In FIG. 3, a first substrate 110 and a second substrate 210 are spaced apart from each other. The second substrate 210 is formed of transparent insulating material and the first substrate 110 may be formed of transparent material or relatively less transparent material. An absorption layer 120 is formed on the first substrate 110 to absorb light. A first alignment layer 130 is formed on the absorption layer 120. A polyimide is usually selected for an alignment layer material because it exhibits good alignment characteristics with various liquid crystal materials. A cholesteric liquid crystal (CLC) color filter 140, which reflects a light of particular wavelength, is formed on the alignment layer 130. The first alignment layer 130 aligns liquid crystal molecules of the cholesteric liquid crystal (CLC) color filter 140. The cholesteric liquid crystal (CLC) color filter 140 selectively reflects incident light and the reflected light shows a red, green or blue color in each pixel region. The reflected light at the cholesteric liquid crystal (CLC) color filter 140 does not exactly have a single wavelength but has a certain wavelength range on the basis of a main wavelength. An overcoat layer 150 is formed on the cholesteric liquid crystal (CLC) color filter 140 and a first electrode 160 is formed on the overcoat layer 150 using transparent conductive material. A second alignment layer 170 is formed on the first electrode 160 using material such as polyimide. A second electrode 220 is formed beneath the second substrate 210 using the transparent conductive material, and a third alignment layer 230 is formed beneath the second electrode 220 using material such as polyimide, for example. A retardation layer 310 and a polarizer 320 are subsequently formed on the second substrate 210. The retardation layer 310 has the phase difference value of $\lambda/4$ and thus changes a linear polarization into a circular polarization or the circular polarization into the linear polarization. The polarizer 320 transmits only the light that is parallel to the light transmission axis. A liquid crystal layer 400 is interposed between the second alignment layer 170 and the third alignment layer 230. An alignment of liquid crystal molecules is changed according to an applied voltage between the first electrode 160 and the second electrode 220. The cholesteric liquid crystal (CLC) color filter 140 selectively reflects the incident light. For example, a right-handed cholesteric liquid crystal (CLC) reflects a right circular polarization that has a wavelength corresponding to the pitch of the right-handed cholesteric liquid crystal (CLC). That is, a direction of a circular polarization of the reflected light depends on whether the helix structure of the cholesteric liquid crystal (CLC) is right-handed or left-handed. Because the selective reflection of the cholesteric liquid crystal (CLC) color filter 140 can be controlled by varying the pitch of the cholesteric liquid crystal (CLC) helix, light for different colors can be reflected at each pixel region by varying the pitch in each pixel region. The pitch is a parameter that decides a hue of the cholesteric liquid crystal (CLC). That is, if the pitch is same as a wavelength of red color, i.e., 650 nm, the cholesteric liquid crystal (CLC) reflects the red color observed in a front direction. The pitch of the cholesteric liquid crystal (CLC) helix can be controlled to selectively reflect or transmit the incident light having a wavelength in a particular range. Accordingly, the reflected light may show red, green or blue color in each pixel region.

Because a thin film transistor, i.e., a switching element, and a pixel electrode that is connected to the thin film transistor are usually formed on an upper substrate according a conventional liquid crystal display device that has the cholesteric liquid crystal (CLC) color filter, the second electrode 220 serves as the pixel electrode. Each pixel region for each color red, green or blue respectively corresponds to the second electrode 220, and each of the second electrodes 220 corresponding to each pixel region is respectively connected to the thin film transistor (not shown). On the other hand, the thin film transistor (not shown) may alternatively be formed on the first substrate 110. If the thin film transistor is formed on the first substrate 110, the first electrode 160 serves as the pixel electrode and corresponds to each pixel region. Each of the first electrodes 160 corresponding to each pixel region is respectively connected to the thin film transistor (not shown).

Figure 4:
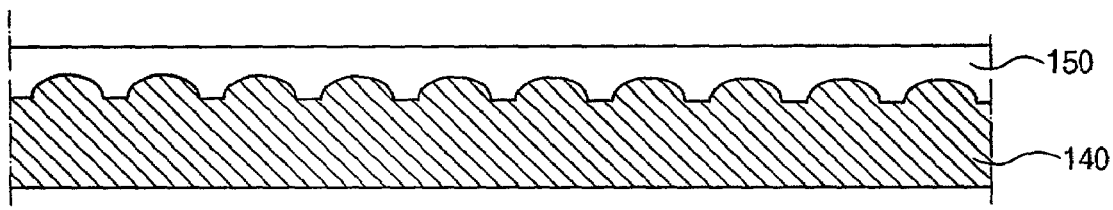
FIG. 4 is an enlarged view of "A" of FIG. 3.

FIG. 4 is an enlarged view of "A" of FIG. 3. In FIG. 4, an upper portion of the cholesteric liquid crystal (CLC) color filter 140 has a shape like curved protrusions and the overcoat layer 150 is formed on the cholesteric liquid crystal (CLC) color filter 140. The curved protrusions of the cholesteric liquid crystal (CLC) color filter 140 are for obtaining a uniform luminance regardless of the viewing angle by diffusing the light that is reflected from the cholesteric liquid crystal (CLC) color filter 140. The shape, a size and a distribution of the protrusions are controlled to make a distribution of the reflected lights be uniform within a viewing angle range of 30 degree upward and downward from a front direction or be decreased gradually. If the distribution of the reflected light is gradually decreased, a decreased amount of the distribution of the reflected light should not be over 20% of the luminance of the front direction. The overcoat layer 150 is for leveling uneven surface of the cholesteric liquid crystal (CLC) color filter 140 and for controlling the distribution of the reflected light into a desired direction. A refractive index of the overcoat layer 150 is adjusted to make the incident light be perpendicular to a surface of the cholesteric liquid crystal (CLC) color filter 140, and thereby a wavelength change of the reflected light can be decreased. If the wavelength change of the reflected light is decreased, a color change degree according to the viewing angle can be decreased. In addition, the refractive index of the overcoat layer 150 is desirably selected to make a distribution of the reflected light be uniform within a viewing angle range of 30 degree upward and downward from the front direction or be decreased gradually. If the distribution of the reflected light is gradually decreased, a decreased amount of the distribution of the reflected light should not be over 20% of the luminance of the front direction.

FIGS. 5A to 5E are cross-sectional views illustrating a fabrication process for a lower substrate of a reflective cholesteric liquid crystal (CLC) display device that has a CLC color filter according to the present invention.

Figure 5A:
FIGS. 5A to 5E are cross-sectional views illustrating a fabrication process for a lower substrate of a reflective cholesteric liquid crystal (CLC) display device having a CLC color filter according to the present invention.

In FIG. 5A, the absorption layer 120 is coated and then cured on the first substrate 110, and then the first alignment layer 130 is coated and cured on the absorption layer 120. The surface of the first alignment layer 130 is aligned into a certain direction using a rubbing method or a light (photoalignment) alignment method. The first alignment layer 130 may be formed of polyimide.

Figure 5B:
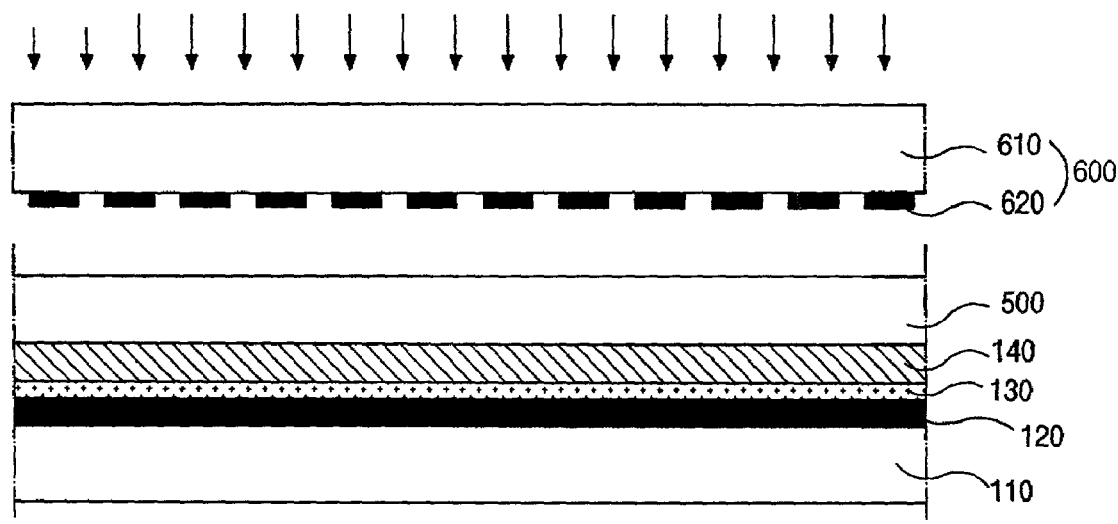

In FIG. 5B, the cholesteric liquid crystal (CLC) is coated on the first alignment layer 130. After a coloring process in which the pitch of the cholesteric liquid crystal (CLC) helix is controlled to display red, green or blue color in each region for each color, the cholesteric liquid crystal (CLC) is cured using light or heat to complete the cholesteric liquid crystal (CLC) color filter 140. A photoresist layer 500 is then formed on the cholesteric liquid crystal (CLC) color filter 140 and exposed to light using a mask 600. The mask 600 has a plurality of light blocking portions 620 beneath an insulating substrate 610.

Figure 5C:
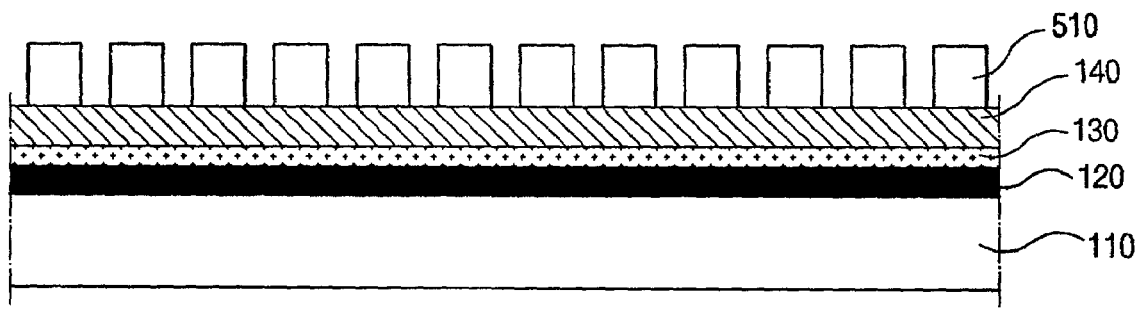

In FIG. 5C, a plurality of photoresist patterns 510 are formed by developing the exposed photoresist layer 500 of FIG. 5B. If a positive photoresist is used for a photolithographic masking process, an exposed portion of the photoresist is removed after a development and vice versa in case of a negative photoresist. The positive photoresist is used in the embodiment of the present invention, but the negative photoresist may alternatively be used.

Figure 5D:
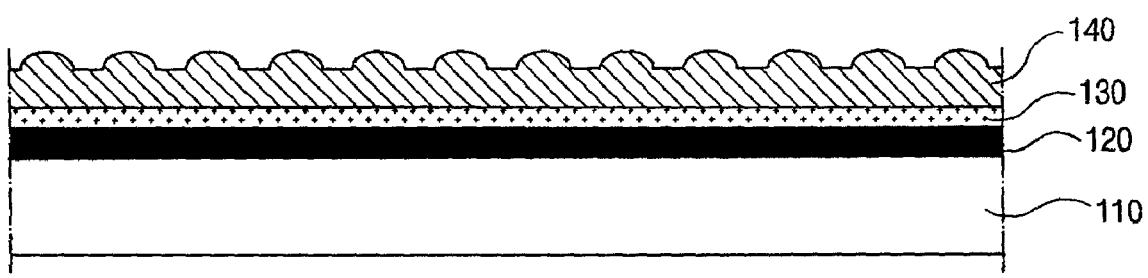

In FIG. 5D, the plurality of protrusions of the cholesteric liquid crystal (CLC) color filter 140 is formed by patterning exposed portions of the cholesteric liquid crystal (CLC) color filter 140 between photoresist patterns 510 and then removing the photoresist patterns 510. The patterning of the cholesteric liquid crystal (CLC) color filter 140 may be performed using a dry etching method in which an etching gas is used.

Figure 5E:
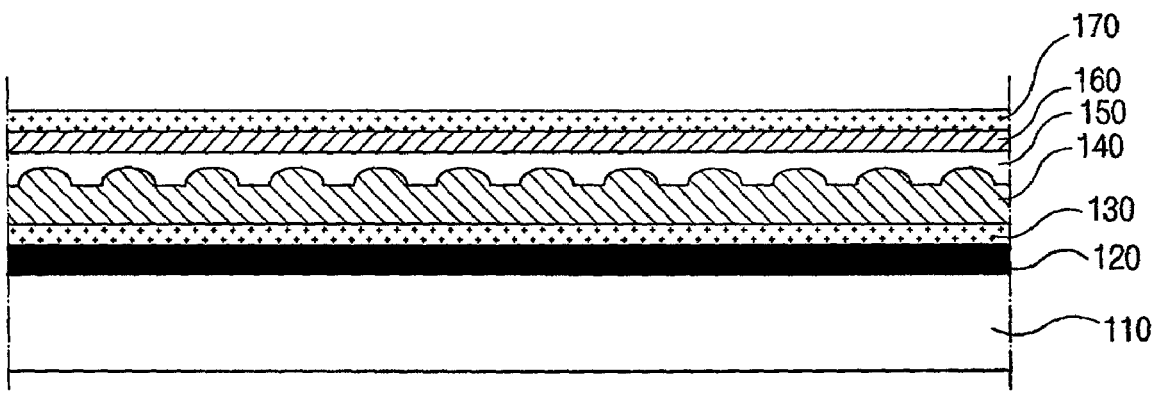

In FIG. 5E, the overcoat layer 150 is formed on the cholesteric liquid crystal (CLC) color filter 140 to level the uneven surface of the cholesteric liquid crystal (CLC) color filter 140. The first electrode 160 is formed on the overcoat layer 150 using transparent conductive material. The second alignment layer 170 is formed on the first electrode 160 by coating material such as polyimide and then rubbing and curing the coated material. The first electrode 160 may be formed of indium tin oxide (ITO) or the like.

As described before, the refractive index of the overcoat layer 150 is adjusted to make the incident light be perpendicular to a surface of the cholesteric liquid crystal (CLC) color filter 140, and thereby a wavelength change of the reflected light can be decreased. If the wavelength change of the reflected light is decreased, a degree of color change according to the viewing angle can be decreased. The reflective cholesteric liquid crystal (CLC) display device according the present invention can provide uniform luminance and color in the main viewing angle region by reducing the incidence angle of the light that is incident on the cholesteric liquid crystal (CLC) color and by diffusing the reflected light using a plurality of protrusions of the cholesteric liquid crystal (CLC) color filter.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A reflective cholesteric liquid crystal (CLC) display device, comprising:
    a first substrate;
    an absorption layer on the first substrate;
    a cholesteric liquid crystal color filter on the absorption layer, the cholesteric liquid crystal color filter having a plurality of protrusions, a shape, a size and a distribution of the protrusions being controlled to make a distribution of reflected light be uniform within a viewing angle range of about 30 degrees upward and downward from a front direction;
    an overcoat layer on the cholesteric liquid crystal (CLC) color filter;
    a first electrode on the overcoat layer;
    a second substrate;
    a second electrode beneath the second substrate;
    a retardation layer on the second substrate;
    a polarizer on the retardation layer; and
    a liquid crystal layer between the first electrode and the second electrode.

2. The device according to claim 1, wherein a shape, a size and a distribution of the protrusions are controlled to make a distribution of reflected light be decreased gradually within about 20% of the luminance of a front direction.

3. The device according to claim 1, wherein the reflective cholesteric liquid crystal display device further includes a thin film transistor, which switches a signal to the second electrode, on the second substrate.

4. The device according to claim 1, wherein the reflective cholesteric liquid crystal (CLC) display device further includes a thin film transistor, which switches a signal to the first electrode, on the first substrate.

5. A manufacturing method of a lower substrate for a reflective cholesteric liquid crystal (CLC) display device, comprising:
    forming an absorption layer on an insulating substrate;
    forming a cholesteric liquid crystal color filter over the absorption layer, the cholesteric liquid crystal color filter having a plurality of protrusions, a shape, a size and a distribution of the protrusions being controlled to make a distribution of reflected light be uniform within a viewing angle range of about 30 degrees upward and downward from a front direction;
    forming an overcoat layer on the cholesteric liquid crystal color filter; and
    forming a transparent electrode on the overcoat layer.

6. The method according to claim 5, wherein the plurality of protrusions of the cholesteric liquid crystal color filter is formed through exposing and developing a photoresist film.

7. The device according to claim 1, wherein the protrusions have a rounded surface.

8. A method of forming a reflective liquid crystal display device having a cholesteric liquid crystal color filter, comprising:
    forming an absorption layer on a first substrate;
    forming a first alignment layer on the absorption layer;
    coating a cholesteric liquid crystal on the alignment layer;
    forming a photoresist layer on the cholesteric liquid crystal layer;
    providing a mask having a plurality of transmissive portions and a plurality of blocking portions over the photoresist;
    exposing the photoresist to light;
    removing selected portions of the photoresist;
    patterning the cholesteric liquid crystal layer using the photoresist as a mask to form a plurality of protrusions on the cholesteric liquid crystal layer;
    providing an overcoat layer over the protrusions and the cholesteric liquid crystal layer to form a substantially even surface;
    providing a second substrate opposite the first substrate; and
    interposing a liquid crystal between the first and second substrates.

9. The method of claim 8, wherein the photoresist is a negative photoresist.

10. The method of claim 8, wherein the photoresist is a positive photoresist.

11. The method of claim 8, further comprising forming a first electrode on the overcoat layer.

12. The method of claim 8, further comprising forming a second alignment layer on the second substrate.

* * * * *